United States Patent [19]

Griffin

[11] 4,058,459
[45] Nov. 15, 1977

[54] LIQUID FILTER APPARATUS

[76] Inventor: John W. Griffin, 310 N. Neel Place, Kennewick, Wash. 99336

[21] Appl. No.: 566,930

[22] Filed: Apr. 10, 1975

Related U.S. Application Data

[63] Continuation-in-part of Ser. No. 398,948, Sept. 20, 1973, abandoned.

[51] Int. Cl.² .......................................... B01D 27/10
[52] U.S. Cl. .................................. 210/132; 210/266; 210/317; 210/489; 210/503
[58] Field of Search ................................ 210/130–133, 210/314, 317, 266, 489, 503, DIG. 13; 55/316, 512, 525

[56] References Cited

U.S. PATENT DOCUMENTS

| | | | |
|---|---|---|---|
| 2,325,657 | 8/1943 | Burkness | 210/134 |
| 2,571,828 | 10/1951 | Brezek | 55/512 X |
| 2,843,268 | 7/1958 | Kennedy | 210/295 |
| 2,936,891 | 5/1960 | Kukowski et al. | 210/131 |
| 2,969,127 | 1/1961 | Cook | 55/525 X |

Primary Examiner—Frank A. Spear, Jr.
Assistant Examiner—Ferris H. Lander
Attorney, Agent, or Firm—H. Gordon Shields

[57] ABSTRACT

Apparatus is disclosed which filters moisture and solid contaminants from liquids, and includes full flow and bypass apparatus.

12 Claims, 4 Drawing Figures

LIQUID FILTER APPARATUS

CROSS-REFERENCE TO RELATED APPLICATION

This is a continuation-in-part of copending application, Ser. No. 398,948, filed Sept. 20, 1973, now abandoned.

BACKGROUND OF THE INVENTION

1. Field of the Invention:

This invention relates to fluid filtering apparatus, and, more particularly, apparatus for filtering or purifying liquids, such as oil, to remove moisture and particulate matter.

2. Description of the Prior Art:

The removal of impurities, including moisture and particulate matter from liquids, such as hydraulic fluids and lubricants, is a branch of technology which is increasing in importance as technology increases. One of the most important uses for fluid filters is in automobiles, in which the oil, used as a lubricant and as a coolant, must continually be filtered in order that the oil perform well and accomplish its designed functions. As indicated, there are two broad types of contaminants for liquids, including oil. These categories of contaminants are moisture or water, and particulate matter, which may be any type of foreign solid matter, such as sand, dirt, carbon particles, metal filings or chips, and the like. Typically, oil filters now used in automobiles include cotton layers, which are generally successful in stopping solid particulate matter, depending on the size of such particulate matter, and paper-type filters in which cellulose fibers, interwoven, are used to entrap and thus filter particulate matter from the oil. Neither of these types of filters is able to filter moisture, such as water, from oil. Other types of materials are required if such moisture is to be removed from oil.

There are generally two types of filters in use.

One is referred to as a full flow filter, in which the entire flow of fluid, such as oil, is subject to a filterint medium. The other type of filter is termed a bypass filter in which only a certain portion of the fluid flow is subject to filtration at any particular time. Over a total period of time, the entire flow of fluid, or the entire quantity or mass of liquid, is passed through or is subject to the filtering medium. Since only a portion of the fluid is passed through the filter at any time, there is not a requirement for a pressure relief valve, as is required with the full flow type filters. If the filtering medium becomes clogged, the result will merely be no filtration. However, there should always be sufficient fluid circulating so as to allow proper lubrication, if the fluid is a lubricating medium, or, in the case of hydraulic fluid, there should always be sufficient fluid to provide the appropriate hydraulic action.

With such bypass type filters, the filtering medium, or media, may be more effective than can generally be used in the full flow type filter. In the full flow type filter there is a possibility of a blockage of the fluid, or of a substantial decrease in the pressure of the fluid, if the filter becomes clogged. Accordingly, the filtering agent is generally limited in the size particles which can be filtered out and a pressure relief valve is generally provided. If the filter becomes clogged, then to continue the flow of fluid a pressure relief valve must be provided. Such pressure relief valve is generally a spring loaded valve set to open when the pressure or force against the spring reaches a pre-determined amount.

Some prior art filter apparatus have been developed which use heat in a chamber to remove water or water vapor by evaporation. The same heat may also at the same time remove, as from oil filters, fuel in the form of fuel vapor which has become trapped in the oil and which dilutes the oil. Fuel dilution in oil reduces the viscosity and accordingly the lubricating ability of the oil. A substantial disadvantage of such heat requirements is that a source of heat must be available. The source of heat in such filter apparatus is generally an electric heating element, powered from the alternator or generator of the engine.

With respect to particle size, typical filtering material, such as cotton fiber and/or felt, will generally filter particles down to about one micron, or perhaps slightly less. Paper filtering material may filter particles to about thirty or forty microns in size. However, the paper and the cotton and/or felt has no effect on water vapor, which passes right through the filter material with the fluid being filtered.

Some prior art filter apparatus, such as that described in the Burkness patent, U.S. Pat. No. 2,325,657, have combined filter media for filtering particulate matter, such as cotton, wool, steel wool, and the like, with some type of filtering medium for removing moisture, or odors and the like. The apparatus of Burkness includes two types of filter media, and it comprises a full flow type filter.

Another type of filter apparatus is disclosed in the Cook patent, U.S. Pat. No. 2,969,127. The Cook patent is designed to be used with an electrostatic precipitation unit by filtering large particles of dust and dirt from a flow of air. The filter is defined as an "expanded washable aluminum foil" filter, which comprises parallel rows or layers of rigid aluminum set substantially perpendicular to the flow of air, to provide a barrier against which larger particles of dust and dirt are trapped while allowing the air to pass therethrough. The aluminum is regular in configuration, and disposed in a fixed geometric and spaced apart relation with respect to the rows and layers. While the Cook apparatus is illustrated as comprising rigid twists of aluminum about a core, a very similar type filter exists in which a rigid honeycomb type filter is used rather than twists of aluminum about a central core. The layers of rigid honeycomb are bonded together and present again a large, rigid surface against which large particles of dust and air are trapped.

A bypass type filter is disclosed in the Kennedy patent, U.S. Pat. No. 2,843,268. This bypass type filter includes both a full flow cartridge and a part flow cartridge for filtering particulate matter from a liquid. In the full flow portion of the filter, and also in the part flow portion, a single filtering medium is used. A venturi is used in the part flow portion of the filter apparatus to help in providing a flow of fluid through the full flow portion of the apparatus.

The Kukowski et al patent, U.S. Pat. No. 2,936,891, is a typical illustration of a full flow type filter in which the fluid filtering medium is concentrically disposed within a cylinder. When the filter medium becomes substantially clogged, a pressure relief bypass opens to allow the flow of fluid through the filter apparatus, without any filtering taking place.

Only particulate matter is filtered by the Cook apparatus, the Kennedy apparatus, and the Kukowski apparatus. Obviously, the size of the particulate matter which the apparatus is able to filter varies, depending on the filtering media used, and the degree of saturation of the filtering media.

The filtering or purifying apparatus described and claimed herein includes material which will filter particles down to the size of about one micron or less and will also remove moisture or water vapor from the filtered material.

SUMMARY OF THE INVENTION

This invention comprises filtering apparatus for the removal of both solid particulate matter and water from liquids. Aluminum strips and silica gel are the primary filtering media used. The silica gel removes or filters water from the filtered liquid and the aluminum strips, in layers, remove solid particulate matter as the fluid passes through the strips.

Among the objects of this invention are the following:

To provide new and useful filtering apparatus;

To provide new and useful filtering apparatus for removing solid particles and water from a liquid;

To provide new and useful filtering apparatus using strips of aluminum foil and silica gel as the filtering media;

To provide new and useful full flow filtering apparatus;

To provide new and useful bypass filtering apparatus; and

To provide new and useful filter elements.

DESCRIPTION OF THE PREFERRED EMBODIMENT

Figure 1:
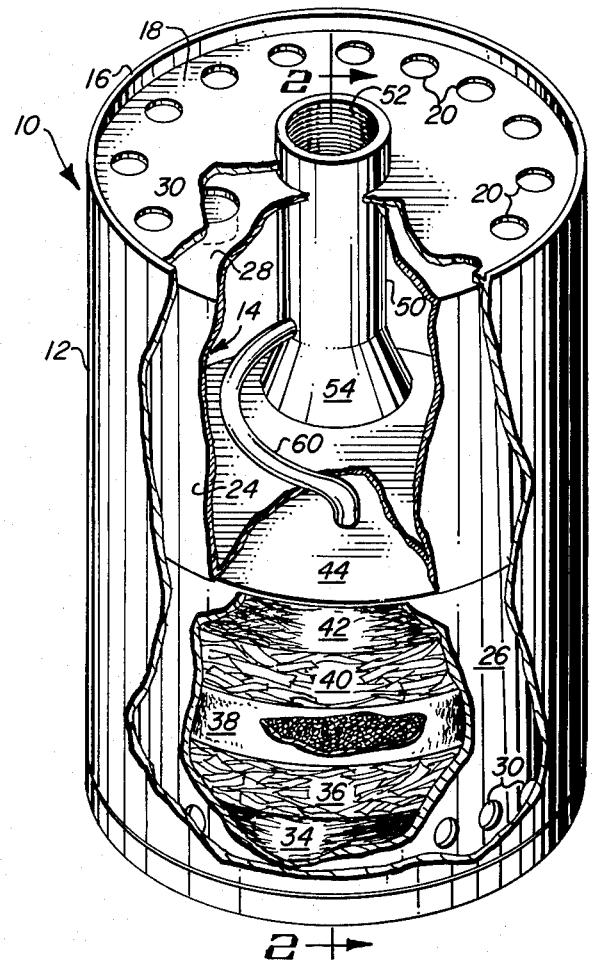
FIG. 1 is a view of apparatus embodying the present invention, with a portion of the apparatus cut away and in partial section.

FIG. 1 is a view of filtering apparatus 10 which incorporates the present invention. The filter apparatus 10 includes a pair of cylinders or housings, an outer cylinder or housing 12 and an inner cylinder 14. In use, the filter apparatus 10 is secured by threaded engagement to the motor, or other use application apparatus, and it must form an adequate seal therewith. Accordingly, seal means is provided at the upper portion 16 of the outer cylinder 12. Typically, the upper portion 16 comprises a circumferentially extending portion which includes a circular seal, of an appropriate substance such as neoprene or the like, disposed in a groove. A top plate 18 is recessed slightly below the top of upper portion 16. The top plate is secured to the outer cylinder or housing 12 and comprises the top or upper closure thereof. A plurality of apertures 20 extends through the top plate and allows the flow of the fluid (liquid) to be filtered from the source of the fluid (liquid) on the apparatus to communicate with the interior of the outer cylinder 12.

The bottom or lower portion of outer cylinder 12 is completely closed by a bottom plate (see FIG. 2, reference numeral 22) which is either sealed to the outer cylinder housing as by appropriate fastening means, such as welding or the like, or it is an integral part of the outer cylinder housing, such as would be formed if the housing and the bottom plate were stamped or formed out of a single sheet of metal.

Within outer cylindrical housing 12 is an inner cylinder housing 14. The inner cylinder 14 is of a lesser diameter than the outer cylinder 12 and is accordingly spaced apart therefrom. The space between the cylinders thus allows the liquid, such as oil, which is to be filtered or purified, to circulate about the exterior of the inner cylinder 14. The inner cylinder is secured to the bottom of the outer cylinder, and is slightly less in overall height than the outer cylinder. There is accordingly a space between the top of the inner cylinder and the top of the outer cylinder.

The inner cylinder 14 is divided into two portions, an upper inner cylinder 24 and a lower inner cylinder 26. The upper inner cylinder 24 comprises a conventional paper or cellulose filter, which is the full flow filter portion of the present invention.

The inner cylinder 14 is closed by top plate 28 which is disposed on the top of the upper inner cylinder 24. The top plate 28 includes a pressure relief valve 30. The pressure relief valve may be of any appropriate construction, and is well known in the art. It serves to permit the circulation of the fluid from the exterior of the inner cylinder to within the inner cylinder if the filter apparatus becomes clogged to the extent that there is no flow of fluid from exterior of the inner cylinder to the interior thereof. This provides for the flow of fluid under the most adverse conditions, with respect to the filter apparatus, and prevents the engine or other apparatus to which the filter is secured from being starved for lack of fluid.

The lower inner cylinder 26 comprises the housing for the bypass filter portion of the present apparatus. It is preferably made of impervious material and it includes a plurality of apertures 32 located at the lower periphery of the lower inner cylinder 26. The apertures 32 allow fluid to communicate from the exterior of the inner cylinder, which is the space between the inner and the outer cylinder, and the filter apparatus within the lower inner cylinder 26.

The filter apparatus disposed within lower inner cylinder 26 comprises layers of various filter type media or materials. The first layer 34 of filter material is preferably long fiber cotton material, of gauze-like material. This is the first layer of filter material which receives the flow of fluid to be filtered through apertures 32. This material filters out particulate matter down to between 30 and 35 microns in diameter.

Immediately above the first filter layer 34 of cotton material is filter layer 36, which comprises a plurality of layers of aluminum foil material. Typically, there is a minimum of about 5 or 6 layers of flat aluminum strips or shredded foil, each strip of which is about ⅜ths of an inch by ⅜ths of an inch (⅜ inch X ⅜ inch) in dimension. However, size is not critical. The purpose of the strips is to act as a filter and thus to prevent the oil from channeling through the strips.

The aluminum layers comprise a random assortment or orientation of the aluminum strips or shreds in a stratified or layer disposition. The strips are preferably rectangular in shape or configuration, and are disposed in a generally flat, parallel relationship. That is, individual pieces or strips of aluminum foil are placed in a flat or planar orientation. Additional pieces or strips are randomly oriented with respect to each other, with the flat, planar sides of the strips disposed against adjacent or overlying and underlying strips. That is, there is a generally parallel relationship between the flat sides of the strips. Obviously, the strips are flexible and accordingly conform as required to adjacent strips to produce a layered, randomly oriented filter layer. The random orientation prevents the liquid being filtered from channeling through the strips and acts to diffuse the liquid so that all the liquid is subjected to the filtering effect of the aluminum strips.

Next above the first layer of aluminum strips is a layer about ⅜ths of an inch to ½ inch thick, of silica gel. Silica gel is amorphous silica gel, normally made by the dehydration of a precipitate formed by the acidification of sodium silicate. Silica gel is a well known desiccant material and the primary use of the silica gel in the present invention is to remove water from the filtered liquid medium.

Above the layer 38 of silica gel is a layer 40 of aluminum strips. The layer 40 is substantially the same as the layer 36, and it comprises a minimum of about five or six layers of aluminum strips, each strip of which is about ⅜ths of an inch by ⅜ths of an inch. In the present apparatus, the layers of aluminum strips, layers 36 and 40, will filter particulate matter down to the size of about one micron or less. While neither the number of layers of strips or the size of the strips is critical in the present invention, the layers of aluminum strips filter out particulate matter from the oil or other fluid (liquid) being filtered and prevent the oil from creating a channel through the filtering material. Thus, the more layers of strips, the less the likelihood for the channeling of the fluid therethrough and the greater the effectiveness of the filtering process with respect to the longer time the liquid is subject to the filtering process of the aluminum strips, and hence the greater the amount of particulate matter that the aluminum strip filters are able to filter out and hold. For the sake of practicality, there is, of course, a point of diminishing returns with respect to the number of layers of aluminum strips in the filter apparatus.

Disposed above the top layer 40 of aluminum strips is a barrier or spacer layer 42 of material, such as felt, steel wool, or nylon mesh. The layer comprises a barrier between the layer 40 of aluminum strips in the lower inner cylinder 26 and a plate 44 which caps the lower inner cylinder. The barrier holds the aluminum strips in place to prevent their clogging a conduit through which the liquid flows out of the lower inner cylinder, as explained more fully below. The layer 42 also comprises a spacer between the aluminum strips and the conduit.

The bypass filter within lower inner cylinder 26 thus includes five different layers of filter material. The first layer 34 is the cotton material, preferably long fiber cotton, which is the first filter material to which the fluid or liquid medium to be filtered is subject as the liquid flows through apertures 32 in the lower portion of lower inner cylinder 26. The second layer is the first layer 36 of aluminum strips, disposed immediately above the cotton layer 34. Between the first layer 36 of aluminum strips and the second layer 40 of aluminum strips, which second layer is the fourth layer of filtering material, is a desiccant layer 38 of silica gel. The primary function of the silica gel is to remove water from the oil or other liquid which is filtered by the apparatus. The layers 36 and 40 of aluminum strips filter particles from the fluid down to the size of about a micron or less. The fifth layer of filter material is layer 42, which comprises a barrier and spacer layer of felt, steel wool, nylon, or the like, to hold the top layer 40 of aluminum strips in place.

A threaded tubular conduit 50 is secured to the top plate 18 of the outer cylinder 12. The tubular conduit includes an internally threaded portion 52 which extends above the top plate 18 and outwardly from the outer cylinder 12. The tubular conduit is sealingly secured to the top plate 28 of the inner cylinder 14, and it extends into the interior of the upper inner cylinder 24. Within the upper inner cylinder 24 of the inner cylinder housing 14 the tubular conduit 50 terminates in an outwardly flared portion 54. The flared portion 54 is a portion of the conduit in which the diameter of the conduit has increased by an outward flare at the lower end of the conduit and wholly within the upper inner cylinder.

A conduit 60 extends from and through the plate 44 to the conduit 50. The conduit 60 is connected to the conduit 50 at about the location at which the flared portion 54 begins to increase in diameter from that of the conduit 50. The diameter of conduit 60 is substantially less than that of the conduit 50.

The flow of liquid, such as oil, into the filter apparatus 10, is through apertures 20 in the top plate 18 of the outer cylinder housing 12. The liquid flows through the apertures 20 under pressure of a pump of some type, either engine driven on a motor vehicle, or some other type pump in other use applications. The liquid flows from apertures 20 into the space between the outer cylinder housing 12 and the inner cylinder housing 14. From this space, some of the liquid flows through the full flow filter of the upper inner cylinder 24, and some of the liquid flows through the apertures 32 at the lower or bottom end of the lower inner cylinder 26 and thus into the bypass filter disposed therein. The liquid which flows through the conventional filter element, which comprises the upper inner cylinder 24, flows into the interior thereof, and into the flared portion 54 of conduit 50. The flow out of the filter is through the conduit 50.

There is also a flow of liquid through the five layers of the bypass filter within lower inner cylinder 26 and through the interior of the upper inner cylinder 24 by conduit 60 to conduit 50. The liquid thus flowing through the bypass filter mixes with the liquid from the full flow filter as the liquid flows out of the filter through conduit 50.

The flow of liquid through the flared portion 54 into the reduced diameter portion of the conduit 50 causes an increase of the flow of liquid in the conduit 50 and a consequent reduction on the pressure of the liquid. This results in a type of pump action which "pulls" liquid from the bypass element through conduit 60. This pumping action enhances the flow of liquid through the bypass filter.

Figure 2:
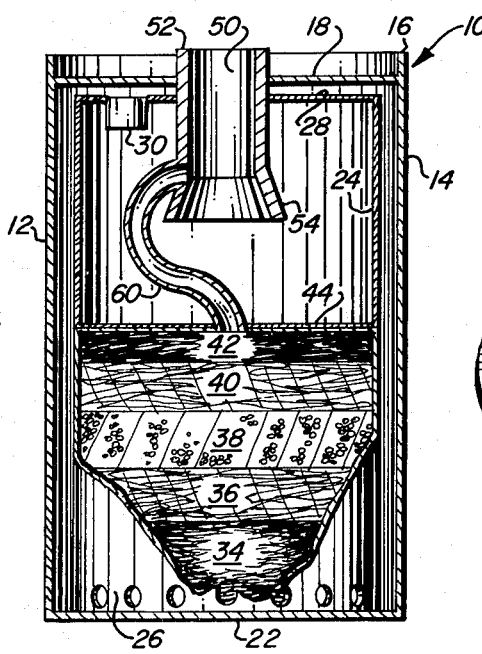
FIG. 2 is a view of a portion of the apparatus of FIG. 1 taken along line 2—2 of FIG. 1, partially cut away and in partial section.

FIG. 2 is a sectional view of the apparatus of FIG. 1 taken generally along line 2—2 of FIG. 1. The components of the filter apparatus 10 are thus shown in the sectional view. The outer cylinder 12, with its upper portion 16 and its top plate 18 are shown, with the inner cylinder 14 disposed therein. A bottom plate 22 closes the lower end of the outer cylinder housing 12. The inner cylinder housing 14 is of a less diameter than the outer cylinder 12 and is secured to bottom plate 22 of the outer cylinder. The inner cylinder 14 is also lesser in height than the outer cylinder, and there accordingly is a space between the outer cylinder 12 and the inner cylinder 14 and between the top plate 18 of the outer cylinder 12 and the top plate 28 of the inner cylinder 14. The liquid accordingly flows into the space between the inner cylinder and the outer cylinder, including between the top plates of the respective cylinders, through apertures in the top plate 18 (see FIG. 1). Inner cylinder 14 includes an upper inner cylinder 24, which is a conventional paper filter element and which comprises a full flow filter, and a lower inner cylinder 26, which comprises a bypass filter. The lower inner cylinder 26 is a generally impervious housing which includes a plurality of apertures at the lower end thereof, through which fluid flows into the interior of the lower inner cylinder 26. The flow of fluid through the bypass filter is subjected to the filtering processes of five different layers of materials, the first layer 34 of which is preferably cotton, the second layer of which is aluminum strips, the third layer of which is silica gel, the fourth layer of which is again aluminum strips, and the fifth layer of which is preferably felt, or the like, and which comprises a barrier and spacer layer to hold the top layer of aluminum strips in place. Plate 44 closes the top of the bypass filter and thus closes the top of lower inner cylinder 26.

Included in top plate 28 of the inner cylinder 14 is a pressure relief valve 30, the function of which has been explained above. A tubular conduit 50 is also secured to the top plate 28 and it extends through the top plate 28, through top plate 18 of the outer cylinder 12. The conduit terminates above the top plate 18 in a threaded portion 52. Within upper inner cylinder 24 the conduit 50 terminates in a flared portion 54.

As the liquid flows into the filter apparatus under pressure of some type of pump, the liquid flows, still under pressure, into the space between the inner and outer cylinder. Some of the liquid flows through the upper, full flow filter and some of the liquid flows through apertures 26 and into the lower, bypass filter. The liquid flowing into the lower filter is still under pressure and some of the pressure is transmitted to and against the filter layer 36 of aluminum strips. The pressure accordingly compresses the aluminum strips, increasing the density of the filter layer. The pressure is also transmitted to the other filter layers, including the layer 38 of desiccant material and the layer 40, which is the second filter layer of aluminum strips. The desiccant layer will be compressed somewhat and the filter layer 40 of aluminum strips will also be compressed under the hydraulic force of the fluid under pressure. The barrier and spacer layer 42 will also be compressed. Under the compressive force the functions of the layer 42, as discussed above, become clearer and more significant, especially in preventing the aluminum strips from clogging the conduit or pipe 60.

The conduit 60 extends between the plate 44 and the tubular conduit 50, where it joins the tubular conduit adjacent and above the flared portion 54.

Figure 3:
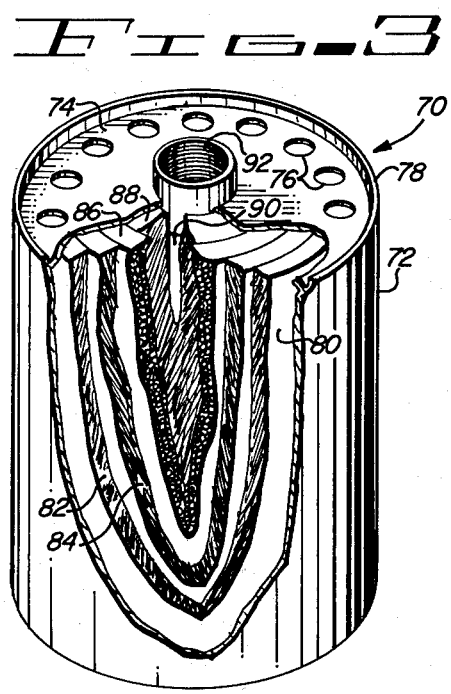
FIG. 3 illustrates an alternate embodiment of apparatus of the present invention, partially cut away and in partial section.

FIG. 3 discloses an alternate embodiment of purifier or filter apparatus of the present invention. The bypass filter apparatus shown in FIGS. 1 and 2 is disclosed in FIG. 3 in a different configuration of embodiment.

Filter apparatus 70, which is a bypass type filter, includes cylindrical housing or cylinder 72, closed at the top by a top plate 74. The top plate includes a plurality of apertures 76 which allow liquid to be filtered to flow into the interior of the cylinder 72. The cylinder 72 is closed at the bottom by a bottom plate sealingly secured to the outer cylindrical housing 72. The top plate 74 is recessed slightly below the top circumferentially extending edge 78 of the cylindrical housing 72. The top edge 78 includes appropriate seals (not shown) for sealingly engaging the filter 70 to the apparatus with which it is designed to operate. Within the cylindrical housing 72 are concentric layers of filter material spaced apart from the inside of the cylindrical housing 72, and disposed beneath top plate 74 of the housing. Accordingly, there is a space 80 between the first layer, the outer layer 82, of the filter material and the inside of the cylindrical housing 72 and beneath top plate 74. This provides adequate space for the unrestricted flow of fluid through apertures 76 into the filter.

The layers of filter material are coaxially extending and adjacent each other. The outer layer 82 is preferably cotton material, substantially the same as the cotton material 34 described above in conjunction with FIGS. 1 and 2. As previously indicated, this long fiber cotton material filters out and thus removes particulate matter down to between about 30 and 35 microns.

The second layer, layer 84, is the first layer of aluminum foil strips. These strips are substantially the same as layers 36 and 40 described above in conjunction with FIGS. 1 and 2. In the embodiment of FIG. 3, layer 84 is formed in the shape of a hollow cylinder. There is preferably a minimum of at least about five separate layers of aluminum strips in the layer 84.

The third filtering layer, layer 86, is a tubularly configured layer of desiccant material, such as silica gel, which has been described above in conjunction with layer 38 of FIGS. 1 and 2. The desiccant filters out water from the liquid being filtered, such as oil.

The fourth layer, layer 88, is the second layer of aluminum strips, substantially the same as layer 84. As described above with respect to FIGS. 1 and 2, layers 84 and 88 of aluminum strips are disposed on either side of the layer of silica gel desiccant, and they perform substantially the same filtering function as above described. Appropriate means may be required to form and hold the layers of aluminum strips and the silica gel in place and in their respective tubular configurations.

As the flow of fluid passes from space 80 consecutively through layers 82, 84, 86 and 88, it passes to a central interior space 90 of the filter, which is defined by a rigid cylindrical conduit 92, perforated to allow liquid to flow into the space after filtration. From the interior space of the filter, the fluid flows out of the filter through an upper internally threaded portion of conduit 92. The conduit is sealingly secured to top plate 74 and to the inner layer 88 of aluminum strips to prevent the flow of fluid from bypassing the filter layers of flowing directly from space 80 to the conduit 92. If desired, a barrier or spacer layer of felt, nylon mesh, or the like, may be disposed concentrically between the conduit 92 and the inner layer 88 of aluminum strips.

As with the embodiment of FIGS. 1 and 2, the pressure of the liquid exerts an inwardly directed force compressive against the filter layers, compressing the aluminum strips against the conduit 92. Both filter layers of aluminum strips are thus compressed to increase their density.

Each filter layer is comprised of many small, thin, discrete strips of aluminum, oriented randomly with the flat, thin sides of the discrete strips juxtaposed against and overlying each other and generally parallel to adjacent strips.

Figure 4:
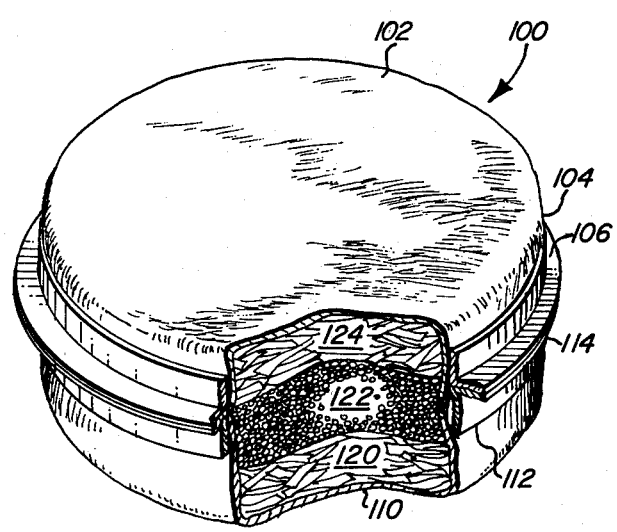
FIG. 4 illustrates another alternate embodiment of apparatus utilizing the present invention, in partial section, and partially cut away.

FIG. 4 discloses an alternate embodiment of filter or purifier apparatus described above. The filter apparatus is in the configuration of a wafer element and may be inserted in bypass filter canisters.

The filter or purifier apparatus 100 includes a pair of housings, an upper housing 102 and a lower housing 110. The housings are configured as a pair of low cups, with each including an outer circumferentially extending side or rim portion and an outwardly extending flange and a planar portion. The upper housing 102 is generally circular, with its rim or side portion 104 extending generally perpendicular to the flat, planar portion, and extending radially outwardly from the rim portion is a flange 106. The lower housing is substantially a mirror image of the upper housing, and it also includes a rim portion 112 extending generally to the flat, planar portion of the housing and it also terminates in a radially outwardly extending flange 114. The flanges 106 and 114 matingly engage each other and are sealingly secured together. The flanges provide a seal for the wafer filter apparatus 100 to insure that liquid to be filtered flows through the filter apparatus.

Within the filter are a pair of filter layers of aluminum strips, the first or lower layer 120 and the third or upper layer 124. The aluminum strips are substantially the same as has been described above in conjunction with FIGS. 1 through 3. That is, each filter layer comprises a minimum of about five or six layers of discrete aluminum strips, each of which strips is preferably about ⅜ths × ⅜ths of an inch in size, rather thin, and of course flexible.

Sandwiched between the layers 120 and 124 of aluminum strips is a desiccant layer 122 of silica gel. The purpose of the silica gel with respect to the removal of water from the liquid to be filtered has been described above in conjunction with FIGS. 1, 2, and 3. As noted, the silica gel desiccant layer may be about ⅜ths to ½ inch in thickness.

The upper and lower housings of the filter apparatus 100 may be made of appropriate material, such as metal, with appropriate apertures in the housings to allow for the flow of fluid therethrough. In the alternative, the rims and flanges of the respective housings may be made of metal with the generally planar portions of another type of material, such as cotton fibers, cotton felt, nylon netting, or the like, which allow liquid to flow therethrough and through the filtering layers 120, 122, and 124. If the housing were generally rigid, such as metal, the housing would comprise a base against which the filter layers would be compressed by the hydraulic force of the liquid under pressure. If only the rims and flanges are solid, then the unit in which the wafer filter element is disposed preferably includes or provides a rigid frame or base against which the filter layers may be compressed.

The filter apparatus described herein, including the apparatus of FIGS. 1, 2, 3, and 4, is capable of purifying a liquid by the removal of both particulate matter and water. Moreover, it is able to remove particulate matter in size down to about a micron or less. The filter apparatus is capable of great flexibility in that it may be configured as a bypass type filter, a wafer filter element, or as a combination of full flow and bypass type filter. In the latter embodiment, if the full flow portion of the filter were to cease operation, as from clogging, or rupture, or the opening of the pressure relief valve, the bypass portion would continue to operate.

Semantically, the pieces of aluminum which comprise the discrete elements for the aluminum filter layers have been referred to as "strips." The pieces are simply flat segments of thin, flexible aluminum foil. While length and width dimensions have been given, and have thus given the segments or pieces or strips a rectangular configuration, such configuration and size is not critical. The fluid, as it moves through the filter layer, separates into small droplets and/or streamlets and flows around and between the discrete pieces, oriented randomly with respect to adjacent pieces, and particulate matter suspended in the liquid is filtered out in the process. The pieces of material are, of course, impervious and the liquid cannot flow through a discrete piece, but rather flow around each one in a tortuous or maze-like path during which filtration takes place.

While the principles of the invention have been made clear in illustrative embodiments, there will be immediately clear to those skilled in the art many modifications of structure, arrangement, proportion, the elements, materials, and components used in the practice of the invention, and otherwise, which are particularly adapted for specific environments and operative requirements without departing from those principles. For example, and not by way of limitation, various types of barrier materials, and various types of cotton, felts, and paper filter materials may be used. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Filter apparatus for filtering water and particulate matter from a liquid, comprising, in combination:
   first filter means including a layer comprising a plurality of stratified discrete flat strips randomly oriented in planar layers, with the flat portion of adjacent strips generally parallel and disposed against each other, for filtering particulate matter from the liquid,
   second filter means including desiccant means for filtering water from the fluid; and
   housing means for the first and second filter means.

2. The apparatus of claim 1 in which the first filter means includes a first filter layer and a second filter layer, and the second filter means is disposed between the first and second filter layers of the first filter means.

3. The apparatus of claim 3 in which the first and second filter layers of the first filter means each comprises a plurality of layers of generally flat pieces of aluminum, each piece of which is randomly oriented and disposed against and in an overlying and underlying relationship with respect to adjacent pieces.

4. The apparatus of claim 3 in which the desiccant means comprises a layer of silica gel.

5. The apparatus of claim 4 in which the housing means includes a circumferentially extending rim and a flange extends outwardly from the rim.

6. The apparatus of claim 5 in which the first and second filter means are disposed concentrically with respect to each other.

7. The apparatus of claim 4 in which the housing means includes a cylindrical housing having a plurality of apertures communicating with the first filter layer of the first filter means for admitting a flow of liquid to the filter apparatus, and a conduit communicating with the second filter layer of the first filter means for providing a flow of fluid out of the filter apparatus.

8. Filter apparatus for filtering particulate matter and water from a liquid, comprising, in combination:
cylinder housing means including means for admitting a flow of liquid into the cylinder housing means;
first inner cylinder means including first filter means for filtering a portion of the flow of liquid;
second inner cylinder means including second filter means for filtering another portion of the flow of liquid, said second inner cylinder means including an impervious housing having a plurality of apertures communicating with a portion of the second filter means disposed within said housing, and said second filter means including a filter layer comprising a plurality of layers of discrete generally flat stratified elements oriented randomly with adjacent elements disposed against each other, and a layer of desiccant means, through which layers the other portion of the liquid sequentially flows;
first conduit means connected to the cylinder housing means and to the first inner cylinder means for providing a flow of liquid out of the inner cylinder means; and
second conduit means connected to and extending between the first conduit means and the second inner cylinder means for providing a flow of liquid from the second inner cylinder means.

9. The apparatus of claim 8 in which the second filter means includes a first and a second filter layer, each of which comprises a plurality of layers of discrete, generally flat elements oriented randomly with adjacent elements disposed against each other, and the layer of desiccant means is disposed between the first and second filter layers.

10. The apparatus of claim 9 in which the generally flat elements comprise aluminum strips and the desiccant means comprises silica gel.

11. The apparatus of claim 8 in which the first conduit means includes a flared portion disposed within the first inner cylinder means.

12. The apparatus of claim 11 in which the second conduit means is connected to the second inner cylinder means and extends to and is connected to the first conduit means adjacent the flared portion.

* * * * *